United States Patent [19]
Rahman

[11] Patent Number: 6,061,556
[45] Date of Patent: *May 9, 2000

[54] SYSTEM AND METHOD FOR SECONDARY TRAFFIC CHARGING IN A RADIO TELECOMMUNICATIONS NETWORK

[75] Inventor: Mohamed Anisur Rahman, Randolph, N.J.

[73] Assignee: Telefonaktiebolaget LM Ericsson (publ), Stockholm, Sweden

[ * ] Notice: This patent issued on a continued prosecution application filed under 37 CFR 1.53(d), and is subject to the twenty year patent term provisions of 35 U.S.C. 154(a)(2).

[21] Appl. No.: 08/847,433

[22] Filed: Apr. 24, 1997

[51] Int. Cl.$^7$ .................................................. H04M 15/00
[52] U.S. Cl. ...................... 455/406; 455/408; 455/67.1
[58] Field of Search ...................... 455/406, 407, 455/408, 405, 422, 515, 517, 524, 67.1; 379/114, 118, 121, 124; 370/329, 343, 345, 431

[56] References Cited

U.S. PATENT DOCUMENTS

| | | |
|---|---|---|
| 4,204,093 | 5/1980 | Yeh . |
| 4,638,476 | 1/1987 | Acampora et al. . |
| 4,788,679 | 11/1988 | Kataoka et al. . |
| 5,065,393 | 11/1991 | Sibbitt et al. ............................ 379/114 |
| 5,101,501 | 3/1992 | Gilhousen et al. . |
| 5,109,390 | 4/1992 | Gilhousen et al. . |
| 5,265,119 | 11/1993 | Gilhousen et al. . |
| 5,267,261 | 11/1993 | Blakeney, II et al. . |
| 5,278,827 | 1/1994 | Pound . |
| 5,278,892 | 1/1994 | Bolliger et al. . |
| 5,303,297 | 4/1994 | Hillis ....................................... 379/114 |
| 5,329,635 | 7/1994 | Wadin et al. . |
| 5,341,396 | 8/1994 | Higgins et al. . |
| 5,375,140 | 12/1994 | Bustamante et al. . |
| 5,416,797 | 5/1995 | Gilhousen et al. . |
| 5,432,842 | 7/1995 | Kinoshita et al. . |
| 5,442,625 | 8/1995 | Gitlin et al. . |
| 5,446,756 | 8/1995 | Mallinckrodt . |
| 5,485,486 | 1/1996 | Gilhousen et al. . |
| 5,488,655 | 1/1996 | Hamlen ................................... 379/114 |
| 5,517,555 | 5/1996 | Amadon et al. ........................ 379/114 |
| 5,794,140 | 8/1998 | Sawyer .................................... 455/406 |
| 5,828,737 | 10/1998 | Sawyer .................................... 455/408 |

FOREIGN PATENT DOCUMENTS

| | | |
|---|---|---|
| 0 506 255 A2 | 9/1992 | European Pat. Off. . |
| 0 600 713 A2 | 6/1994 | European Pat. Off. . |
| 0 680 159 A2 | 11/1995 | European Pat. Off. . |
| WO 95/35637 | 12/1995 | WIPO . |
| WO 96/07288 | 3/1996 | WIPO . |

OTHER PUBLICATIONS

Takuro Sato, Takao Suzuki, Kenji Horiguchi and Atsushi Fukasawa; "Technical Issues of Mobile Communication Systems for Personal Communications Services"; IEICE Transactions on Fundamentals of Electronics, Communications and Computer Sciences; Dec. 1, 1992; vol. E75–A; No. 12; pp. 1625–1633.

*Primary Examiner*—Nguyen Vo
*Assistant Examiner*—Lester G Kincaid
*Attorney, Agent, or Firm*—Smith & Danamraj, P.C.

[57] ABSTRACT

A method and system for charging secondary traffic in a radio telecommunications network. The system includes a mobile switching center (MSC) for delivering a call in the radio telecommunications network and a radio network control Ler (RNC) for controlling the radio telecommunications network. The MSC includes a charging unit for calculating a primary traffic charge, a secondary traffic charge, and a total charge for a call. Additionally, the RNC employs frame structure counters to assess the amount of secondary traffic carried in the call. The method begins by the frame structure counters assessing an amount of secondary traffic carried in a call in the radio telecommunications network. The charging unit then calculates a charge for the secondary traffic carried by the call.

19 Claims, 5 Drawing Sheets

US 6,061,556

SYSTEM AND METHOD FOR SECONDARY TRAFFIC CHARGING IN A RADIO TELECOMMUNICATIONS NETWORK

BACKGROUND OF THE INVENTION

1. Technical Field of the Invention

This invention relates to radio telecommunication systems and, more particularly, to a system and method in a radio telecommunications network for secondary traffic charging.

2. Description of Related Art

In radio telecommunications networks, a wide variety of services such as voice, video, data, and image services are available to subscribers. In using these radio telecommunications networks, the most precious resource is the radio spectrum. To maximize the effectiveness of the networks, code division multiple access (CDMA) has been developed to facilitate communications involving a large number of system users. There are other multiple access communication system techniques, such as time division multiple access (TDMA) and frequency division multiple access (FDMA), however, the spread spectrum modulation technique of CDMA has proven to offer many advantages over the other methods.

In a CDMA system, a unique binary spreading sequence, known as a code, is assigned for each call to each user. Multiplied by the assigned code, the user's signal is spread onto a channel bandwidth wider than the user signal bandwidth. The ratio of the system channel bandwidth to the user's bandwidth is known as the "spreading gain." All active users share the same system channel bandwidth frequency spectrum at the same time. The signal of each user is separated from the other users' signals at the receiver by issuing a correlator keyed with the associated code sequence to "de-spread" the desired signal. In this manner, an increased number of simultaneous users can be served.

In addition to serving an increased number of users, the existing CDMA system supports variable rate service. The variable rate service enables the CDMA system to reduce interference when a user is in the low rate transmission mode. Additionally, when the CDMA system is not at a full rate of transmission, other types of services, called secondary traffic can be transmitted simultaneously.

There are disadvantages in the existing system. First, although the CDMA system is capable of providing secondary traffic services, there is no method or system to charge the subscriber for these additional services. Additionally, there is no way to charge the subscriber a different rate for using the secondary traffic services than what the subscriber is charged for primary traffic services.

Although there are no known prior art teachings of a solution to the aforementioned deficiency and shortcoming such as that disclosed herein, prior art references that discusses subject matter that bears some relation to matters discussed herein are U.S. Pat. No. 5,416,797 to Gilhousen et al. (Gilhousen), U.S. Pat. No. 5,442,625 to Gitlin et al. (Gitlin), and U.S. Pat. No. 4,204,093 to Yeh (Yeh).

Gilhousen discloses a system and method for communicating information signals using spread spectrum communication techniques. The system and method provide for generating signal waveforms in a CDMA cellular system. The system uses pseudonoise modulation sequences that provide orthogonality between the users in order to reduce mutual interference and allow better link performance. However, Gilhousen does not teach or suggest a method or system for the charging of secondary traffic services.

Gitlin discloses a multi-code division multiple access system allowing a user at a radio transmitter to dynamically change its source data bit rate. Thus, Gitlin describes a method to provide variable data rate in a CDMA network. In response to a user input selecting a plurality of source bit rates, an adjustable coding device spreads and transmits the user's digital information received at the selected bit rate to a channel bit rate which at least equals the highest bit rate of the plurality of source bit rates. Thus, Gitlin merely describes a method of supporting variable rate service in a CDMA system. However, Gitlin does not teach or suggest a method or system for counting or reporting the number of frames having secondary traffic. Additionally, no method or system is disclosed for the charging of the secondary traffic services.

Yeh discloses a method for using a communication system to provide variable data rate service in a time-division multiple access (TDMA) network using super frames and sub-frames. The system disclosed by Yeh provides for a technique using a plurality of different frame rates for the individual receiving stations or areas in a TDMA communication system which is dependent on the traffic demands between the various pairs of remote stations or areas making up the communication system. However, Yeh does not teach or suggest counting or reporting the number of frames, and does not disclose a method or system for the charging of secondary traffic services.

Thus, it would be a distinct advantage to have a system and method for the charging of secondary traffic services to a subscriber in a radio telecommunications network. It is an object of the present invention to provide such a system and method.

SUMMARY OF THE INVENTION

In one aspect, the present invention is a system in a radio telecommunications network for charging for secondary traffic services carried by a call in the radio telecommunications network. The system comprises a mobile switching center (MSC) for delivering the call in the radio telecommunications network, and a counting device for assessing an amount of secondary traffic carried by the call from the MSC. Additionally, the system also includes a charging unit for calculating a charge from the amount of the secondary traffic assessed by the counting device.

In another aspect, the present invention is a method of charging for secondary traffic carried by a call in a radio telecommunications network. The method begins by a radio network controller (RNC) assessing an amount of secondary traffic carried by a call. Next, a charging unit determines a charge for the secondary traffic carried by the call.

In another embodiment of the present invention, the present invention is a method of charging for secondary traffic carried by a call in a radio telecommunications network. The method starts by a mobile switching center (MSC) receiving a call. Next, the MSC transmits the call in a frame structure to a radio network controller (RNC). The method continues by the RNC determining whether secondary traffic has been used in the call. The RNC sends a zero charge rate to the MSC, upon determining that no secondary traffic services have been carried in the call.

In still another aspect of the present invention, the present invention is a traffic charging system in a radio telecommunications network in which a call carries both primary traffic and secondary traffic. The system comprises a means for calculating a charge for the primary traffic in the call. Additionally, the system includes a means for calculating a charge for the secondary traffic in the call. The system may also include a means for calculating a total charge for the call.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

The present invention is a system and method in a radio telecommunications network for the charging of secondary traffic services.

Figure 1:
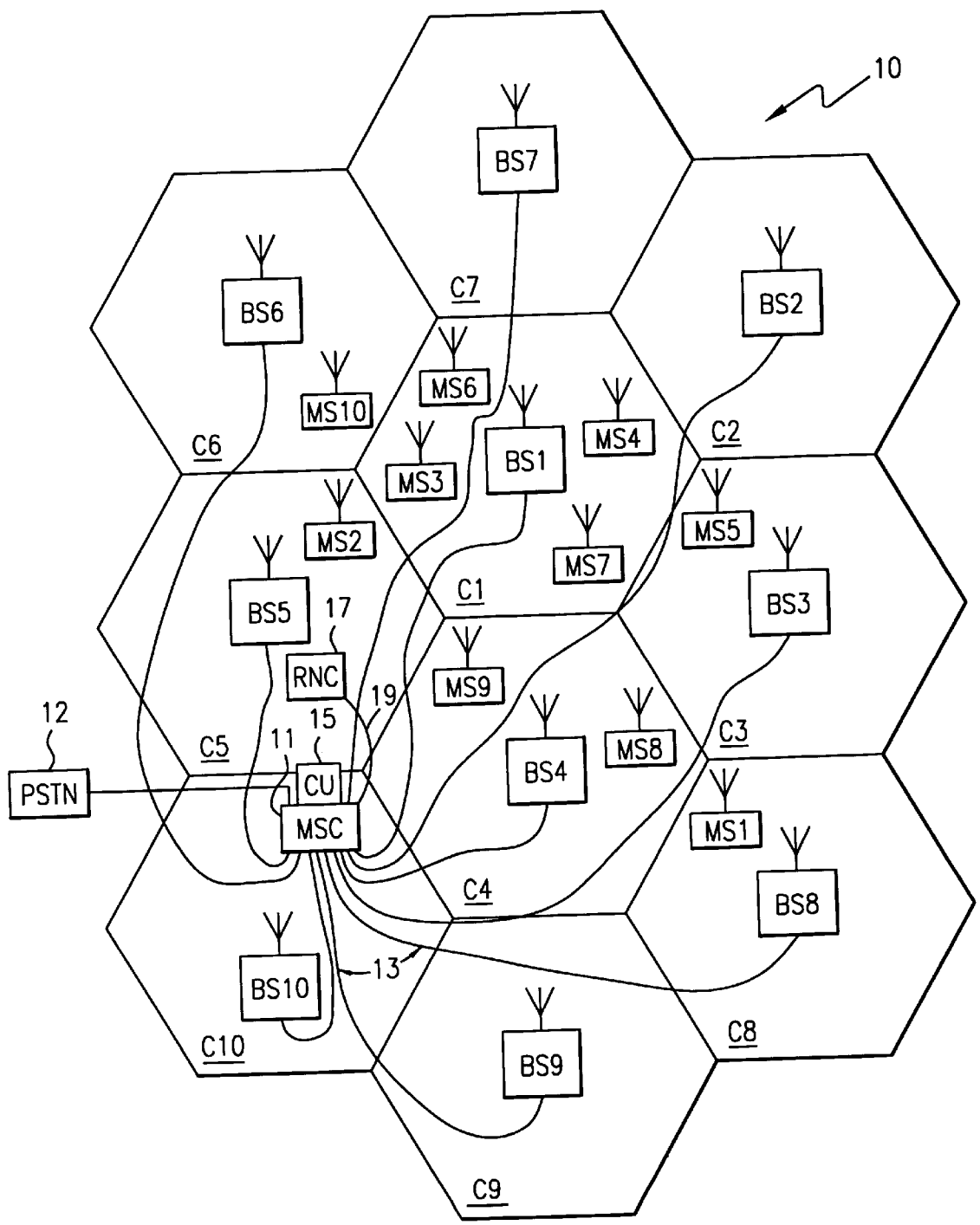
FIG. 1 (Prior Art) is a simplified block diagram illustrating the components of an existing radio telecommunication network using CDMA.

Referring first to FIG. 1, there is illustrated a conventional cellular radio telecommunications network 10 using CDMA of the type to which the present invention may generally pertain. The radio telecommunications network 10 includes base stations BS1–BS10, mobile stations MS1–MS10, a public switched telephone network (PSTN) 12, cells C1–C10, a mobile switching center (MSC) 11, communications links 13, a charging unit (CU) 15, a radio network controller (RNC) 17, and a communications link 19. In FIG. 1, an arbitrary geographic area may be divided into a plurality of continuous radio coverage areas, or cells C1–C10. Although the network of FIG. 1 is illustratively shown to only include 10 cells, it should be clearly understood that in practice, the number of cells could be much larger.

Associated with and located within each of the cells C1–C10, is a base station (BS) designated as a corresponding one of a plurality of base stations BS1–BS10. Each of the base stations BS1–BS10 includes a transmitter, receiver, and a base station controller and are well known in the art. In FIG. 1, the base stations BS1–BS10 are selected to be located at the center of each of the cells C1–C10, respectively, and are equipped with omni-directional antennas. However, in other configurations of a cellular radio network, the base stations BS1–BS10 may be located near the periphery, or otherwise away from the centers of the cells C1–C10 and may illuminate the cells C1–C10 with radio signals either omni-directionally or directionally. Therefore, the representation of the cellular radio network of FIG. 1 is for purposes of illustration only and is not intended as a limitation on the possible implementations of a system for charging of secondary traffic services in a radio telecommunications network.

Located within the radio telecommunications network 10, is the CU 15. The CU 15 establishes the charges for the primary traffic for each call. The CU 15 usually resides within the MSC 11, but can be located away from the MSC 11.

The RNC 17 controls the radio telecommunications network 10. The RNC 17 may either be co-located with the MSC 11 or remotely located away from the MSC 11. In the example shown in FIG. 1, the RNC 17 is located away from the MSC 11 and maintains the communications link 19 in order to communicate with the MSC 11. The RNC 17 maintains control of the flow of data through the MSC 11 and other MSCs (not shown). The data is sent from the MSC 11 to the RNC 17 on a frame by frame basis. In addition, the RNC 17 may control a plurality of MSCs located within the radio telecommunications network 10.

With continuing reference to FIG. 1, a plurality of mobile stations MS1–MS10 are found within the cells C1–C10. Again only ten mobile stations are shown in FIG. 1, but it should be understood that the actual number of mobile stations may be much larger. Moreover, mobile stations MS1–MS10 are illustrated in some of the cells C1–C10. The presence or absence of mobile stations in any particular one of the cells C1–C10 should be understood to depend, in practice on the individual desires of subscribers utilizing the mobile stations MS1–MS10. Subscribers may roam from one location in a cell to another, or from one cell to an adjacent cell or neighboring cell, and even from one cellular radio network served by a mobile switching center (MSC) 11 to another such network all the while receiving and placing calls both within the cellular network 10 as well as the public switch telecommunications network (PSTN) 12 which is connected to the MSC 11. Although not shown in FIG. 1, the MSC 11 may also have associated with it a home location register (HLR) which may be physically separated or connected to the MSC 11. The HLR serves as a database of subscriber information for roaming subscriber. The HLR contains all the mobile subscriber data, such as subscriber identity, supplementary services, bearer services, and location information necessary to route incoming calls. The HLR may be shared by a group of MSCs. Networks employing digital services may also include a message center (MC) (not shown) for storage and routing of short message service (SMS) messages.

Each of the mobile stations MS1–MS10 is capable of initiating or receiving a telephone call through one or more of the base stations, BS1–BS10, and the MSC 11. Such calls may be either for voice or data communications. The MSC 11 is connected by communication links 13 (e.g., cables) to each of the illustrative base stations BS1–BS10 and the PSTN 12 or a similar fixed network which may include an integrated services digital network (ISDN) facility (not shown). The relevant connections between the MSC 11 and the base stations BS1–BS10, or between the MSC 11 and the PSTN 12, are not completely shown in FIG. 1 but are well known to those of ordinary skill in the art. Similarly, it is also known to include more than one mobile switching center (MSC) in the cellular radio network and to connect each additional MSC to a different group of base stations and to other MSCs via cables or radio links.

Each of the cells C1–C10 is allocated a plurality of voice or speech channels and at least one access or control channel, such as a forward control channel (FOCC). The control channel is used to control or supervise the operation of the mobile station by means of information transmitted and received from those units, referred to as messages. Control and administration messages within a cellular radio network are sent in accordance with industry established air interface standards, such as IS-95, the standard for CDMA systems which is hereby incorporated by reference herein. Similar standards govern other digital cellular telecommunication systems and other geographic areas throughout the world, and are well known to those skilled in the art.

The information exchanged between base stations and mobile stations via messages, may include incoming call signals, outgoing call signals, paging signals, paging response signals, location registration signals, voice channel assignments, maintenance instructions, SMS messages, and handoff instructions as the mobile stations travel out of the radio coverage of one cell and into the radio coverage of other cells, as well as other additional items of information such as walling party numbers, time information, and the like. The control or voice channels may operate in either analog or digital mode based upon industry standards.

In the existing radio telecommunications network 10, the MS1–MS10 communicate with other telephones through the MSC 11. The call from one of the mobile stations, MS1–MS10 reaches the MSC 11 through the communications link 13. Prior to the delivery of the call, the RNC 17 receives the call as packets of frames containing the voice and data bits for primary traffic necessary for the transmission of the call, through the communications link 19 from the MSC 11. The RNC 17 assesses the amount of primary traffic in each frame and sends this amount to the CU 15 located within the MSC 11 via the communications link 19. The charging unit 15 establishes the toll for the primary traffic call.

The MS 3 uses Multiplex Option 1 and Multiplex Option 2 for use in variable rate transmission. The standards for Multiplex Option 1 and Multiplex Option 2 are described in ANSI J-STD-008 which is hereby incorporated by reference herein. Table 1 below illustrates the information bit structures used with Multiplex Option 1 in the standard for CDMA personal communications systems listed in ANSI J-STD-008.

| Transmit Rate | Mixed Mode (MM) | Traffic Type (TT) | Traffic Mode (TM) | Primary Traffic (bits/ frame) | Signaling traffic (bits/ frame) | Secondary traffic (bits/ frame) |
|---|---|---|---|---|---|---|
| 9600 | 0 | — | — | 171 | 0 | 0 |
| 9600 | 1 | 0 | 00 | 80 | 88 | 0 |
| 9600 | 1 | 0 | 01 | 40 | 128 | 0 |
| 9600 | 1 | 0 | 10 | 16 | 152 | 0 |
| 9600 | 1 | 0 | 11 | 0 | 168 | 0 |
| 9600 | 1 | 1 | 00 | 80 | 0 | 88 |
| 9600 | 1 | 1 | 01 | 40 | 0 | 128 |
| 9600 | 1 | 1 | 10 | 16 | 0 | 152 |
| 9600 | 1 | 1 | 11 | 0 | 0 | 168 |
| 4800 | — | — | — | 80 | 0 | 0 |
| 2400 | — | — | — | 40 | 0 | 0 |
| 1200 | — | — | — | 16 | 0 | 0 |

Table 1: Primary, Signaling and Secondary Traffic with Multiplex Option 1

Figure 2A:
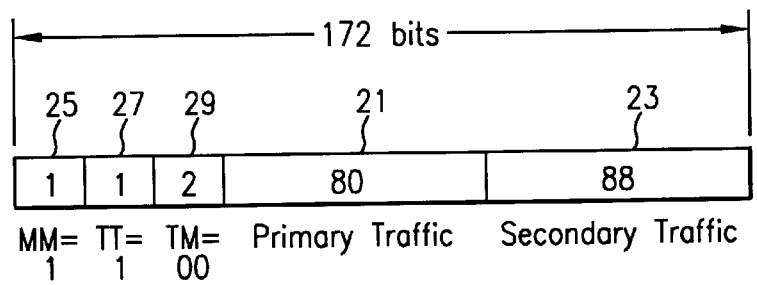
FIGS. 2A–2D (Prior Art) are illustrative drawings showing the information bits for secondary traffic for Multiplex Option 1 in the existing CDMA systems.

FIGS. 2A–2D are illustrative drawings showing the information bits for secondary traffic for Multiplex Option 1 in the existing CDMA systems. FIGS. 2A–2D exemplify the typical frame structure a radio network controller (RNC) receives. Similar frame structures can be found in Multiplex Option 2. In FIG. 2A, the frame structure for half rate in which half of the transmission is primary traffic and half is secondary traffic at 9600 bits per second in Multiplex Option 1 is shown. A primary traffic frame 21 contains 80 bits, while a secondary traffic frame 23 contains 88 bits. A mixed mode frame 25 contains one bit. A traffic type frame 27 contains one bit. Additionally, a traffic mode frame 29 contain two bits.

Figure 2B:
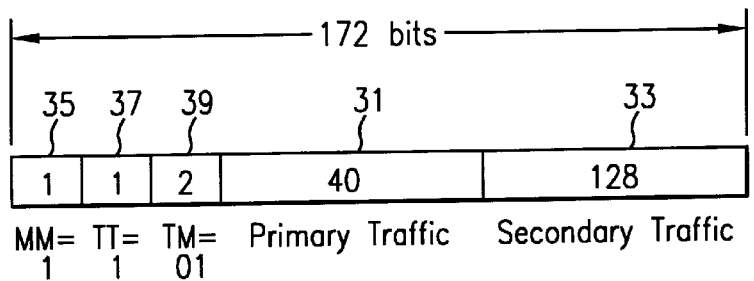

In FIG. 2B, the frame structure for ¼ rate primary traffic and ¾ secondary traffic at 9600 bits per second in Multiplex Option 1 is illustrated. A primary traffic frame 31 contains 40 bits, while a secondary traffic frame 33 contains 128 bits. A mixed mode frame 35 contains one bit. A traffic type frame 37 contains one bit. Additionally, a traffic mode frame 39 contain two bits.

Figure 2C:
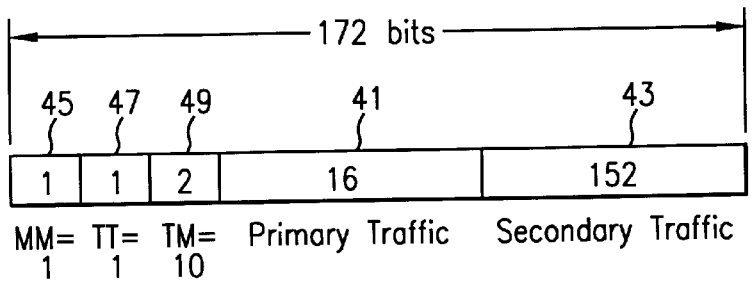

In FIG. 2C, the frame structure for ⅛ rate primary traffic and ⅞ secondary traffic at 9600 bits per second in Multiplex Option 1 is shown. A primary traffic frame 41 contains 16 bits, while a secondary traffic frame 43 contains 152 bits. A mixed mode frame 45 contains one bit. A traffic type frame 47 contains one bit. Additionally, a traffic mode frame 49 contain two bits.

Figure 2D:
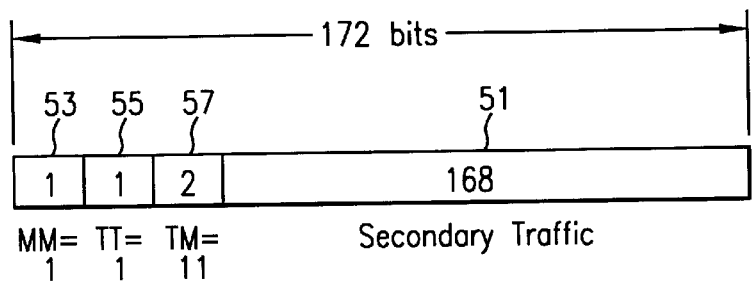

In FIG. 2D, the frame structure for secondary traffic at 9600 bits per second in Multiplex Option 1 is illustrated. There is no primary traffic frame in this example, while a secondary traffic frame 51 contains 168 bits. A mixed mode frame 53 contains one bit. A traffic type frame 55 contains one bit. Additionally, a traffic mode frame 57 contain two bits.

The MS 3 may, likewise, use a variable rate for transmitting in Multiplex Option 2. Table 2 below illustrates the information bit structures used in the standard for CDMA personal communications systems listed in ANSI J-STD-008.

| Transmit Rate (bits/sec) | Mixed Mode (MM) | Frame Mode (FM) | Primary Traffic (bits/frame) | Signaling Traffic (bits/frame) | Secondary Traffic (bits/frame) |
|---|---|---|---|---|---|
| 14400 | 0 | — | 266 | 0 | 0 |
| 14400 | 1 | 0000 | 124 | 138 | 0 |
| 14400 | 1 | 0001 | 54 | 208 | 0 |
| 14400 | 1 | 0010 | 20 | 242 | 0 |
| 14400 | 1 | 0011 | 0 | 262 | 0 |
| 14400 | 1 | 0100 | 124 | 0 | 138 |
| 14400 | 1 | 0101 | 54 | 0 | 208 |
| 14400 | 1 | 0110 | 20 | 0 | 242 |
| 14400 | 1 | 0111 | 0 | 0 | 262 |
| 14400 | 1 | 1000 | 20 | 222 | 20 |
| 7200 | 0 | — | 124 | 0 | 0 |
| 7200 | 1 | 000 | 54 | 67 | 0 |
| 7200 | 1 | 001 | 20 | 101 | 0 |
| 7200 | 1 | 010 | 0 | 121 | 0 |
| 7200 | 1 | 011 | 54 | 0 | 67 |
| 7200 | 1 | 100 | 20 | 0 | 101 |
| 7200 | 1 | 101 | 0 | 0 | 121 |
| 7200 | 1 | 110 | 20 | 81 | 20 |
| 3600 | 0 | — | 54 | 0 | 0 |
| 3600 | 1 | 00 | 20 | 32 | 0 |
| 3600 | 1 | 01 | 0 | 52 | 0 |
| 3600 | 1 | 10 | 20 | 0 | 32 |
| 3600 | 1 | 11 | 0 | 0 | 52 |
| 1800 | 0 | — | 20 | 0 | 0 |
| 1800 | 1 | — | 0 | 0 | 20 |

Table 2: Primary, Signaling and Secondary Traffic for Multiplex Option 2

Figure 3:
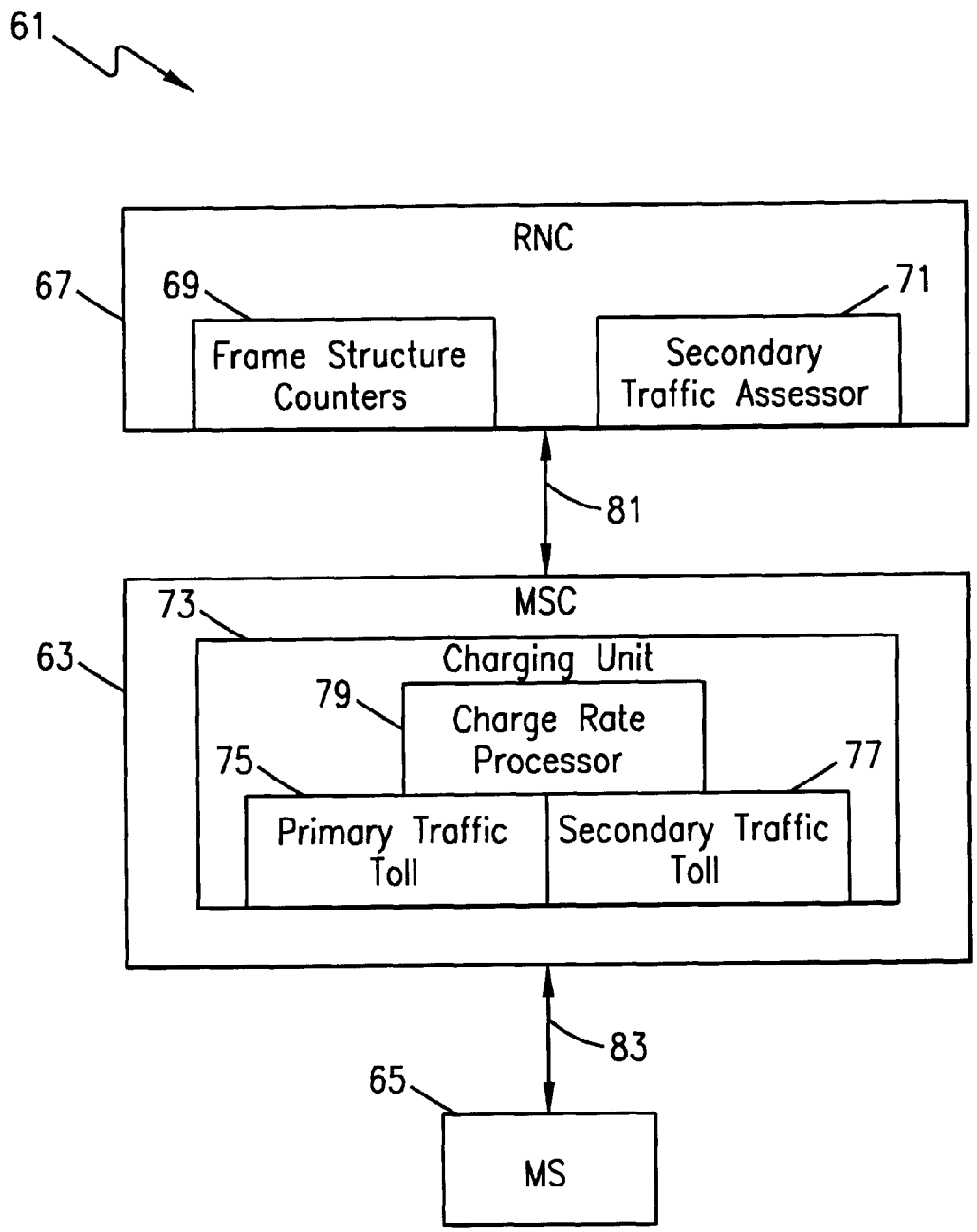
FIG. 3 is a simplified block diagram illustrating the components of a radio telecommunications network which charges for secondary traffic services according to the teachings of the present invention.

FIG. 3 is a simplified block diagram illustrating selected components of a radio telecommunications network 61 which charges for secondary traffic services according to the teachings of the present invention. The radio telecommunications network 61 includes a MSC 63, a MS 65, and a RNC 67 having a plurality of frame structure counters 69 and a secondary traffic assessor 71. The MSC 63 includes a charging unit 73 having a primary traffic toll device 75, a secondary traffic toll device 77, and a charge rate processor 79. Communications links 81 and 83 connect the MSC 63 to the RNC 67 and the MS 65, respectively.

The MSC 63 is a switching center providing all the necessary switching functions in the radio telecommunications network 61.

The MS 65 roams through the coverage area provided by MSC 63. The MS 65 communicates within the radio telecommunications network 61 through the MSC 63.

The RNC 67 controls the radio telecommunications network 61. The RNC 67 may either be co-located with the MSC 63 or remotely located away from the MSC 63. The RNC 67 maintains control of the flow of data receiving and passing the data on a frame by frame basis to and from the MSC 63. The RNC 67 controls all MSCs located within the radio telecommunications network 61. The plurality of frame structure counters 69 determine the amount of secondary traffic contained in each frame of a call. The frame structure counters 69 are established at call setup. In the preferred embodiment of the present invention, the frame structure counters 69 are located within the RNC 67. However, the frame structure counters 69 may be located anywhere within the radio telecommunications system 61. The secondary traffic assessor 71 determines if any secondary traffic has been carried by each call. The secondary traffic assessor 71 is preferably located within the RNC 67, however may be located anywhere within the radio telecommunications system 61.

Within the MSC 63, the charging unit 73 establishes the charges to be tolled for each call. The charging unit 73 preferably resides within the MSC 63, but can be located away from the MSC 63 in other embodiments of the present invention. The charging unit 73 has a primary traffic toll device 75 to determine the charge for the primary traffic services used in each call. The charging unit 73 also has a secondary traffic toll device 77 to determine the charge for the secondary traffic services used in each call. In addition, the charging unit includes a charge rate processor 79 which determines the total charge for each call.

In the radio telecommunications network 61, the MS 65 calls another party through the MSC 63 via the communications link 83. When the call is first setup, the call is sent from the MSC 63 to the RNC 67 as bits of information in a series of frames. The RNC 67 establishes specific frame structure counters 69 in each frame to determine the amount of secondary traffic for each frame. The RNC 67, through the frame structure counters 69, determines the amount of secondary traffic as the call progresses. At the conclusion of the call, the secondary traffic assessor 71 determines if any secondary traffic services have been used in the call. If the secondary traffic assessor 71 determines that no secondary traffic is carried in the call, the RNC 71 sends a secondary amount rate of zero to the MSC 63 via communications link 81. In an alternate embodiment of the present invention, the RNC 67 takes no action if secondary traffic is not carried in the call. If any secondary traffic services have been used in the call, the RNC 67, through the frame structure counters 69 assess the total amount of secondary traffic carried in the call. The RNC 67 then transmits the total amount of secondary traffic for each call to the charging unit 73 via communications link 81. The primary traffic toll device 75 calculates the charge for the primary traffic services in the call. The secondary traffic toll device 77 calculates the charge for the secondary traffic services utilizing the information indicating the amount of secondary traffic services determined by the RNC 67. Since the charging unit 73 utilizes a separate tolling device for secondary traffic services, the radio telecommunications network operator may establish a different charge rate for secondary traffic services than the charge rate for primary traffic services. The charge rate processor 79 calculates the total charge for each call from the data calculated by the primary traffic tolls device 75 and the secondary traffic tolls device 77.

Figure 4A:
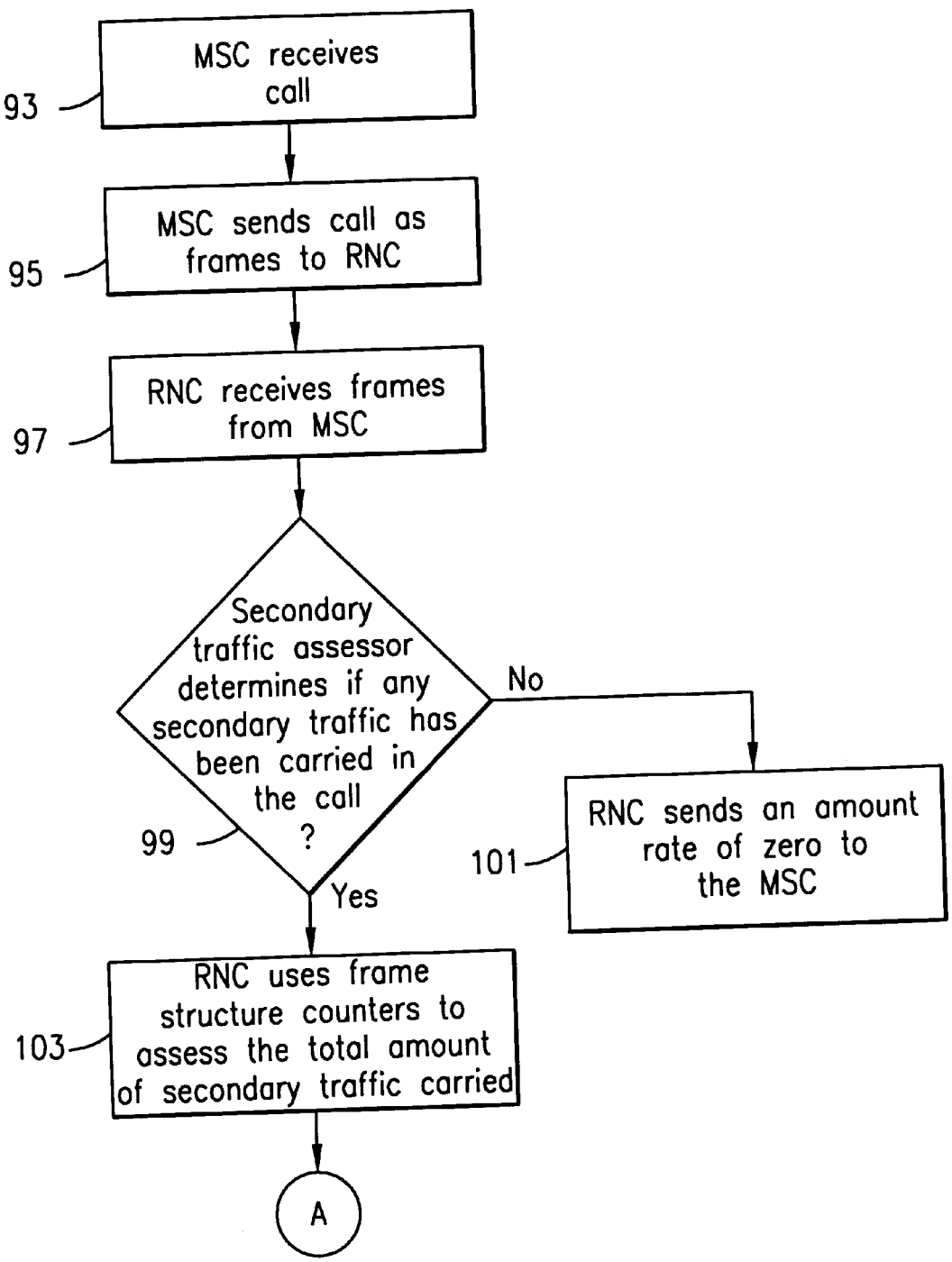
FIGS. 4A and 4B are flow charts outlining the steps of the method of the present invention for charging of secondary traffic services in a radio telecommunications network according to the teachings of the present invention.
Figure 4B:
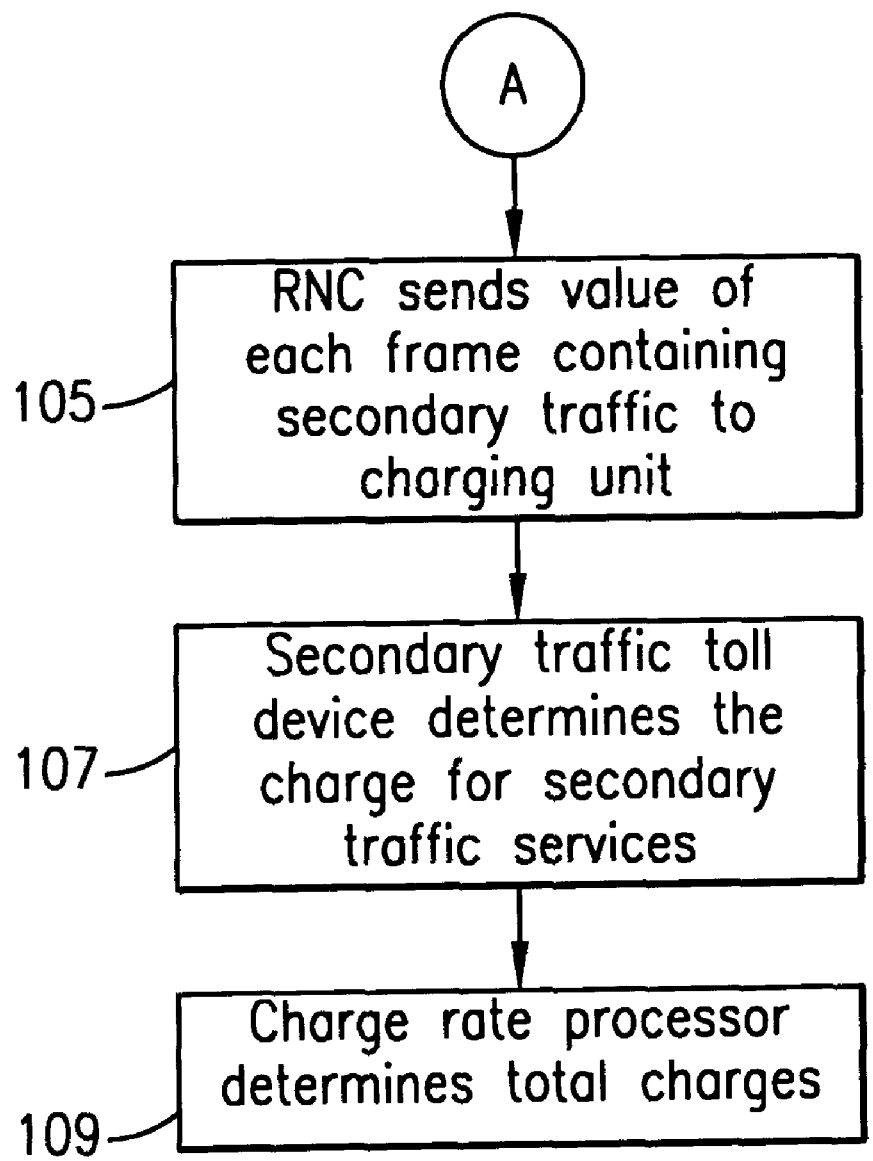

FIGS. 4A and 4B are flow charts outlining the steps for the charging of secondary traffic in a radio telecommunications network. With reference to FIGS. 3, 4A, and 4B, the steps of the method will now be described. Beginning with step 93, the MSC 63 receives a call. The call may originate from the MS 65 or may be delivered to the MS 65. In step 95, the MSC 63 relays the call to the RNC 67 as bits of information on a frame by frame basis. In step 97, the RNC 67 receives the frames of information from the MSC 63. Next, in step 99, it is determined whether or not any secondary traffic has been carried in the call by the secondary traffic assessor 71. If the call has not used secondary traffic services, the method moves to step 101. In step 101, the RNC 67 sends an amount rate of zero for secondary traffic to the MSC 63 via communications link 81. In an alternate embodiment of the present invention, the RNC 67 takes no action if the secondary traffic assessor 71 determines that no secondary traffic has been carried in the call.

If, however, the secondary traffic assessor 71 determines that secondary traffic is contained in the call, the method moves from step 99 to step 103. In step 103, the RNC 67 uses the frame structure counters to assess the total amount of secondary traffic carried in the call. Next, in step 105, the RNC 65 sends the value (amount) of the secondary traffic of each frame of the call to the charging unit 73 via communications link 81. Next, in step 107, the secondary traffic toll device 77 determines the charge for the secondary traffic services used in the call. Then, in step 109, the charge rate processor determines the total charges for the call.

It is thus believed that the operation and construction of the present invention will be apparent from the foregoing description. While the method and system shown and described have been characterized as being preferred, it will be readily apparent that various changes and modifications could be made therein without departing from the spirit and scope of the invention as defined in the following claims.

What is claimed is:

1. A traffic charging system in a radio telecommunications network comprising:

means for multiplexing both primary traffic at a first bit rate and secondary traffic at a second bit rate in a single call;

means for calculating a charge for said primary traffic in said call at a primary traffic charge rate; and means for calculating a charge for said secondary traffic in said call at a secondary traffic charge rate.

2. The traffic charging system of claim 1 further comprising means for calculating a total charge for the call by adding together the charge for primary traffic and the charge for secondary traffic.

3. The traffic charging system of claim 2 wherein said means for calculating a charge for the secondary traffic in the call includes:

a secondary traffic assessor which determines whether any secondary traffic has been carried by said call; and a plurality of frame structure counters which determine an amount of traffic in said call that is secondary traffic.

4. The traffic charging system of claim 3 wherein said means for calculating a charge for said secondary traffic in said call includes a secondary traffic toll device which applies the secondary traffic charge rate to said amount of traffic in said call that is secondary traffic in order to determine a charge for said secondary traffic in said call.

5. The traffic charging system of claim 4 wherein said means for calculating a charge for said primary traffic in said call includes a primary traffic toll device which applies the primary traffic charge rate to said amount of traffic in said call that is primary traffic in order to determine a charge for said primary traffic in said call.

6. The traffic charging system of claim 5 wherein said means for calculating a total charge for said call includes a charge rate processor that combines the charge for said primary traffic in said call and said charge for said secondary traffic in said call.

7. In a radio telecommunications network in which an amount of primary traffic at a first bit rate and an amount of secondary traffic at a second bit rate are multiplexed in a single call, a system for charging for the secondary traffic, said system comprising:

a mobile switching center (MSC) for delivering said call in said radio telecommunications network;

a counting device for assessing the amount of said secondary traffic carried by said call separately from the amount of primary traffic; and a charging unit for calculating a charge for the secondary traffic from said amount of said secondary traffic assessed by said counting device.

8. The system of claim 7 wherein said counting device includes a plurality of frame structure counters for assessing said amount of said secondary traffic.

9. The system of claim 8 wherein said counting device includes a secondary traffic assessor for determining whether any secondary traffic has been carried by said call.

10. The system of claim 7 wherein said charging unit includes:

a primary traffic toll device which applies a primary traffic charge rate to the amount of primary traffic of said call; and a secondary traffic toll device which applies a secondary traffic charge rate to said amount of secondary traffic.

11. The system of claim 10 wherein said charging unit includes a charge rate processor for calculating a total charge for said call.

12. In a radio telecommunications network having a radio network controller (RNC) and a charging unit, a method of charging for secondary traffic carried by a call which carries an amount of primary traffic at a first bit rate and an amount of secondary traffic at a second bit rate, said method comprising the steps of:

multiplexing the primary traffic and the secondary traffic in a single call;

assessing, by said RNC, the amount of said secondary traffic carried by said call separately from the amount of primary traffic; and determining, in said charging unit, a charge for said secondary traffic carried by said call.

13. The method of claim 12 further comprising, before the step of assessing the amount of said secondary traffic, the steps of:

receiving said call in a mobile switching center (MSC); and transmitting said call in a frame structure from said MSC to said RNC.

14. The method of claim 13 further comprising, after the step of assessing the amount of said secondary traffic, the step of sending said amount of said secondary traffic from said RNC to said charging unit.

15. The method of claim 14 wherein said step of determining a charge for said call by said charging unit includes determining a charge for said secondary traffic by a secondary traffic toll device located in said charging unit.

16. The method of claim 15 wherein said step of assessing an amount of said secondary traffic services includes assessing said amount of said secondary traffic by a frame structure counter to determine said amount of secondary traffic of each frame structure.

17. The method of claim 12 further comprising, after the step of assessing the amount of said secondary traffic, the step of determining by said RNC that said secondary traffic has been used in said call.

18. The method of claim 17 further comprising, after the step of determining a charge for said secondary traffic by said charging unit, the step of calculating a total charge for said call by said charging unit.

19. The method of claim 18 wherein said step of calculating a total charge for said call includes calculating a total charge for said call by a charge rate processor located in said charging unit.

* * * * *

UNITED STATES PATENT AND TRADEMARK OFFICE
CERTIFICATE OF CORRECTION

PATENT NO. : 6,061,556
DATED : May 9, 2000
INVENTOR(S) : Mohamed Anisur Rahman

It is certified that error appears in the above-identified patent and that said Letters Patent is hereby corrected as shown below:

In the Abstract, line 5, delete "control Ler" and substitute --controller--therefor.

Signed and Sealed this

Twenty-seventh Day of March, 2001

*Attest:*

NICHOLAS P. GODICI

*Attesting Officer*     *Acting Director of the United States Patent and Trademark Office*